(12) United States Patent
Whitlow et al.

(10) Patent No.: US 10,733,551 B2
(45) Date of Patent: Aug. 4, 2020

(54) SYSTEMS AND METHODS FOR PROVIDING DYNAMIC VOICE-PROMPT DIALOGUE FOR SITUATIONAL AWARENESS ONBOARD AN AIRCRAFT

(71) Applicant: HONEYWELL INTERNATIONAL INC., Morris Plains, NJ (US)

(72) Inventors: Stephen Whitlow, St. Louis Park, MN (US); Stephen O. Hickman, Indianola, WA (US); Michael Dillard, St. Louis Park, MN (US); Aaron James Gannon, Anthem, AZ (US); Barbara Holder, Seattle, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 172 days.

(21) Appl. No.: 15/968,007

(22) Filed: May 1, 2018

(65) Prior Publication Data
US 2019/0340556 A1 Nov. 7, 2019

(51) Int. Cl.
*G08G 5/00* (2006.01)
*G06Q 10/06* (2012.01)
*G10L 15/22* (2006.01)

(52) U.S. Cl.
CPC ..... *G06Q 10/06315* (2013.01); *G08G 5/0034* (2013.01); *G10L 15/22* (2013.01); *G10L 2015/223* (2013.01)

(58) Field of Classification Search
CPC ....................................................... G08G 5/00
See application file for complete search history.

(56) References Cited

U.S. PATENT DOCUMENTS

| 3,925,751 | A | 12/1975 | Bateman et al. |
| 6,778,906 | B1 | 8/2004 | Hennings et al. |
| 8,812,323 | B2 | 8/2014 | Tong et al. |
| 9,227,736 | B2 | 1/2016 | Whitlow et al. |
| 2004/0010354 | A1* | 1/2004 | Nicholas ............... B64C 27/56 701/4 |
| 2010/0017105 | A1* | 1/2010 | Pepitone ............ G08G 5/0008 701/120 |

(Continued)

FOREIGN PATENT DOCUMENTS

| EP | 2826416 A1 | 1/2015 |
| WO | 2016181260 A1 | 11/2016 |

OTHER PUBLICATIONS

Spirkovska, L.; Intelligent Automation Approach for Improving Pilot Situational Awareness; NASA Ames Research Center.

*Primary Examiner* — Shreyans A Patel
(74) *Attorney, Agent, or Firm* — Lorenz & Kopf, LLP

(57) ABSTRACT

A method for providing operational awareness data onboard an aircraft, by a computing device comprising at least a processor and a system memory element, is provided. The method continuously identifies deviations from operational goals of the aircraft, by the processor, based on a current state of the aircraft, a predicted state of the aircraft, and flight crew perception of the current state and the predicted state; and autonomously initiates a dialogue with flight crew onboard the aircraft by providing voice-data prompts for user action onboard the aircraft, by the processor onboard the aircraft, based on the deviations.

15 Claims, 7 Drawing Sheets

(56) References Cited

U.S. PATENT DOCUMENTS

| | | | |
|---|---|---|---|
| 2011/0018740 A1* | 1/2011 | Boren | G08B 6/00 |
| | | | 340/965 |
| 2011/0077803 A1 | 3/2011 | Dehais et al. | |
| 2011/0128235 A1* | 6/2011 | Rogers | G06F 3/04883 |
| | | | 345/173 |
| 2011/0205090 A1 | 8/2011 | Marstall et al. | |
| 2012/0240069 A1* | 9/2012 | Kawalkar | G06F 3/0237 |
| | | | 715/767 |
| 2013/0060466 A1* | 3/2013 | Gurusamy | G01C 23/005 |
| | | | 701/465 |
| 2015/0081138 A1* | 3/2015 | Lacko | B64D 45/00 |
| | | | 701/3 |
| 2016/0009375 A1* | 1/2016 | Young | B64C 9/28 |
| | | | 244/234 |
| 2016/0179327 A1* | 6/2016 | Zammit-Mangion | |
| | | | G01C 23/00 |
| | | | 701/7 |
| 2017/0039858 A1* | 2/2017 | Wang | G10L 25/51 |
| 2017/0277185 A1* | 9/2017 | Duda | G05D 1/101 |
| 2017/0284795 A1* | 10/2017 | Carlson | G01B 11/26 |
| 2017/0365177 A1* | 12/2017 | Puentes | B64D 43/00 |
| 2018/0025653 A1* | 1/2018 | Wang | G08G 5/065 |
| | | | 340/961 |
| 2018/0082596 A1* | 3/2018 | Whitlow | G08G 5/0021 |
| 2018/0251214 A1* | 9/2018 | Lavallee | B64D 31/04 |
| 2019/0019423 A1* | 1/2019 | Choi | G08G 5/04 |
| 2019/0144129 A1* | 5/2019 | Ouellette | B64D 43/00 |
| 2019/0324837 A1* | 10/2019 | Venkataswamy | B64F 5/40 |

\* cited by examiner

SYSTEMS AND METHODS FOR PROVIDING DYNAMIC VOICE-PROMPT DIALOGUE FOR SITUATIONAL AWARENESS ONBOARD AN AIRCRAFT

TECHNICAL FIELD

Embodiments of the subject matter described herein relate generally to intelligent systems initiating a dialogue with a flight crew onboard an aircraft. More particularly, embodiments of the subject matter relate to continuously monitoring operations onboard an aircraft, identifying deviations, and initiating a dialogue in response to deviations.

BACKGROUND

For human teams operating in dynamic complex domains, successful performance is often mediated by a shared awareness of the evolving situation, mission goals, agreed-upon plan, and their roles and responsibilities. Processes to maintain a common understanding by both pilots have been widely adopted. However, building and maintaining a high-functioning, human-machine team requires a shared awareness, between the human and machine, to effectively collaborate and coordinate joint performance of the human-machine team onboard the aircraft. Current human-machine systems are not symbiotic for several reasons, including: (i) intelligent systems are opaque to humans, (ii) a lack of awareness of human understanding and states by machine, and (iii) no common language between human and machine.

Accordingly, it is desirable to facilitate human-machine communication and shared awareness onboard the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing operational awareness data onboard an aircraft, by a computing device comprising at least a processor and a system memory element. The method continuously identifies deviations from operational goals of the aircraft, by the processor, based on a current state of the aircraft, a predicted state of the aircraft, and flight crew perception of the current state and the predicted state; and autonomously initiates a dialogue with flight crew onboard the aircraft by providing voice-data prompts for user action onboard the aircraft, by the processor onboard the aircraft, based on the deviations.

Some embodiments of the present disclosure provide a system for providing operational awareness data onboard an aircraft. The system includes: a system memory element; voice prompt generation hardware, configured to provide articulated dialogue onboard the aircraft; and at least one processor, communicatively coupled to the system memory element and the voice prompt generation hardware, the at least one processor configured to: continuously identify deviations from operational goals of the aircraft, based on a current state of the aircraft, a predicted state of the aircraft, and flight crew perception of the current state and the predicted state; and autonomously initiate a dialogue with flight crew onboard the aircraft by providing voice-data prompts for user action onboard the aircraft, based on the deviations, via the voice prompt generation hardware.

Some embodiments of the present disclosure provide a non-transitory, computer-readable medium containing instructions thereon, which, when executed by a processor, perform a method providing operational awareness data onboard an aircraft. The method identifies a current state of the aircraft and a predicted state of the aircraft, by: extracting avionics system data from one or more avionics data buses; determining the current state of the aircraft, based on the avionics system data; obtaining avionics system logic, from the one or more avionics data buses; and predicting a future state of the aircraft, based on the current state, the avionics system data, and the avionics system logic, wherein the predicted state of the aircraft comprises the future state. The method further identifies flight crew perception of the current state and the predicted state, by: identifying user input actions, based on the avionics system data; and determining the flight crew perception, based on the user input actions. The method also continuously identifies deviations from operational goals of the aircraft, by the processor, based on the current state of the aircraft, the predicted state of the aircraft, and the flight crew perception of the current state and the predicted state; and autonomously initiates a dialogue with flight crew onboard the aircraft by providing voice-data prompts for user action onboard the aircraft, by the processor onboard the aircraft, based on the deviations.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems, apparatus, and methods for ensuring a shared situational awareness between a human operator and intelligent systems implemented onboard an aircraft, such that the intelligent systems infer pilot intention and initiate voice-based dialogue with the pilot based on the inferred pilot intention. More specifically, the subject matter relates to the identification of deviations from operational goals onboard the aircraft, and providing voice-based prompts for the flight crew to correct the deviations onboard the aircraft.

Figure 1:
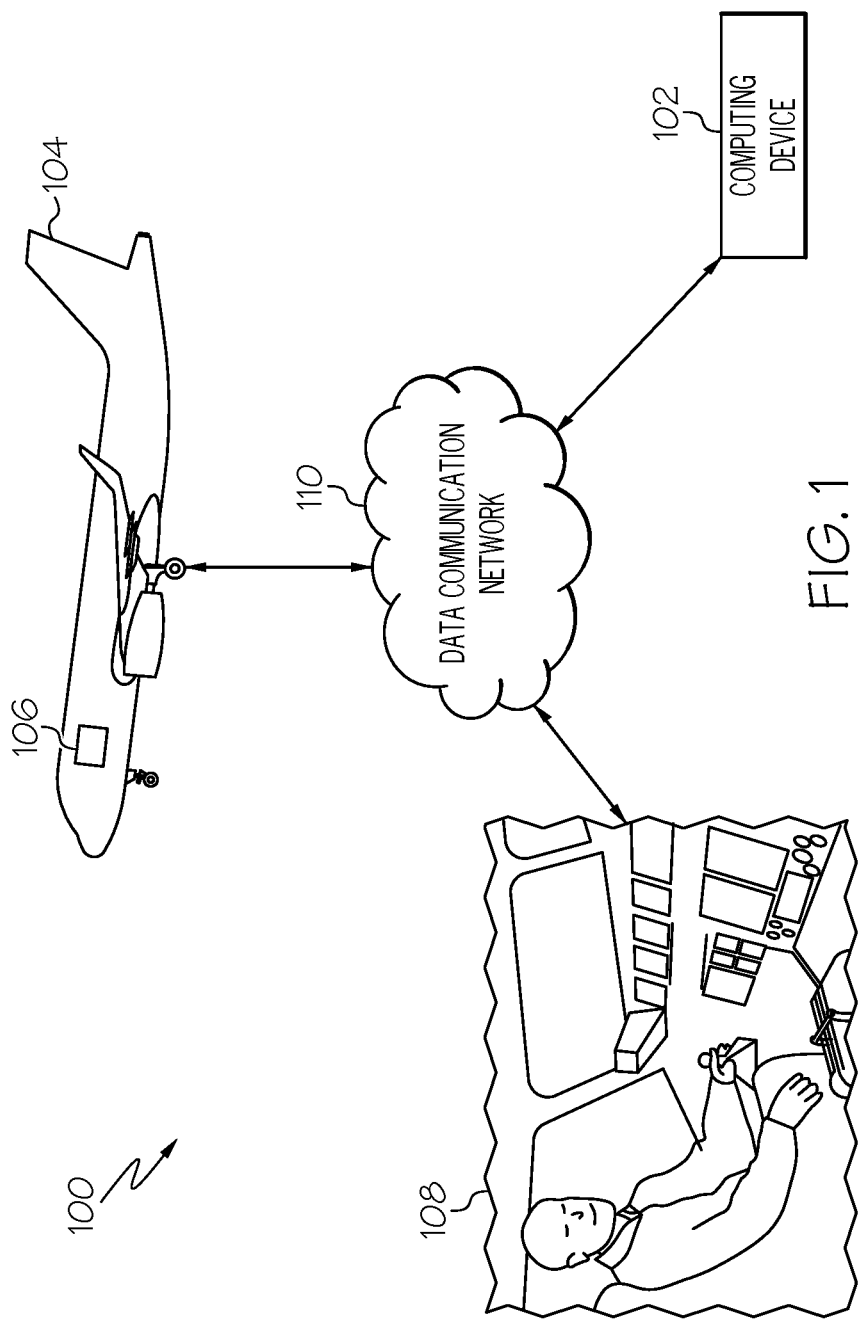
FIG. 1 is a diagram of a dynamic dialogue management system, according to the disclosed embodiments.

Turning now to the figures, FIG. 1 is a diagram of a dynamic dialogue management system 100, according to the disclosed embodiments. The dynamic dialogue management system 100 operates to improve communication between a human-machine flight team that includes (i) a human operator 108 onboard an aircraft 104, and (ii) an intelligent system implemented as a computing device 102 onboard the aircraft 104. To accomplish this, the dynamic dialogue management system 100 uses artificial intelligence of the computing device 102 to infer current understanding or perception of the human operator 108, wherein the current perception may or may not be an accurate representation of the actual conditions onboard the aircraft 104. The dynamic dialogue management system 100 may include, without limitation, a computing device 102 that communicates with one or more avionics systems 106 onboard the aircraft 104, via a data communication network 110. In practice, certain embodiments of the dynamic dialogue management system 100 may include additional or alternative elements and components, as desired for the particular application.

The aircraft 104 may be any aviation vehicle using a human-machine flight team, and which is equipped with a suitable computing device 102. The aircraft 104 may be implemented as an airplane, helicopter, spacecraft, hovercraft, or the like. The one or more avionics systems 106 may include a Flight Management System (FMS), Automatic Dependent Surveillance-Broadcast (ADS-B) devices, navigation devices, weather systems, radar systems, brake systems, or the like. Data obtained from the one or more avionics systems 106 may include, without limitation: flight data, flight plan data, aircraft performance data, FMS data (e.g., operational goals for the flight plan), flight data computers (e.g., data processed onboard the aircraft), as well as data about conditions outside the aircraft such as traffic, weather, runway conditions, or the like.

The computing device 102 may be implemented by any computing device that includes at least one processor, some form of memory hardware, a user interface, and communication hardware. For example, the computing device 102 may be implemented using an integrated computer system or integrated avionics system onboard the aircraft 104, which is configured to facilitate communications between the human-machine flight team (i.e., between the human operator 108 and the computing device 102) to fly the aircraft 104. As another example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to facilitate communications between the human-machine flight team (i.e., between the human operator 108 and the computing device 102) to fly the aircraft 104.

The computing device 102 is usually located onboard the aircraft 104, and the computing device 102 communicates with the one or more avionics systems 106 via wired and/or wireless communication connection. The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 102 obtains relevant data associated with a current aircraft state and conditions, from the avionics systems 106 and avionics systems logic. The computing device 102 also determines predicted aircraft states, based on the avionics systems data and avionics systems logic. Additionally, the computing device 102 obtains operational goals for the flight plan, including a nominal task model associated with the flight plan. Using the identified current aircraft state, the determined predicted state, and the operational goals for the flight plan, the computing device 102 infers the situational awareness and understanding/perception of the flight crew (e.g., the human operator 108). Based on the inferred perception of the flight crew and any deviation from the operational goals and/or nominal task model of the aircraft, the computing device 102 initiates a spoken, voice-based dialogue with the human operator 108 to provide voice-based prompts, queries, and instructions to increase the situational awareness of the flight crew.

Figure 2:
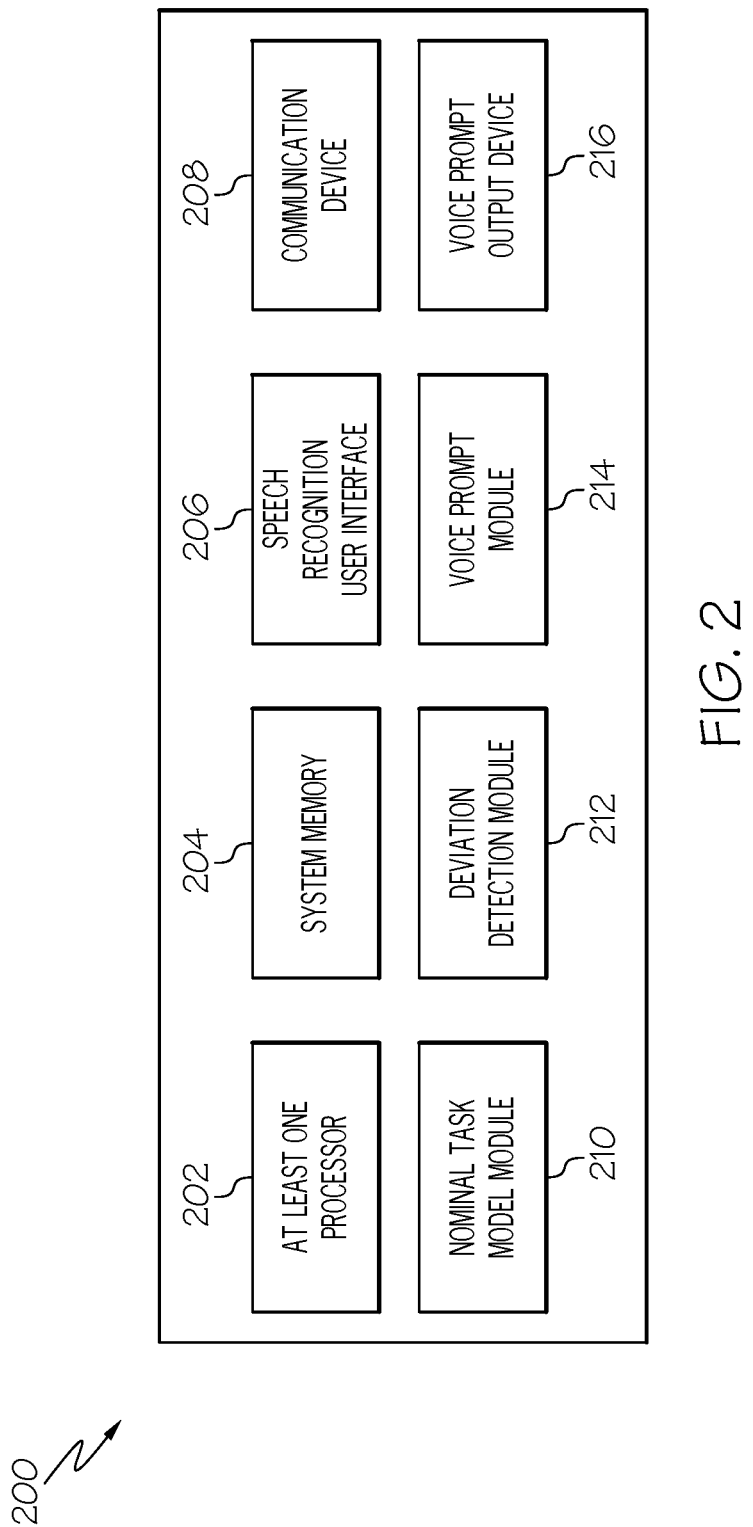
FIG. 2 is a diagram of a computing device for use as part of a dynamic dialogue management system, in accordance with the disclosed embodiments.

FIG. 2 is a diagram of a computing device 200 for use as part of a dynamic dialogue management system, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a speech recognition user interface 206; a communication device 208; a nominal task model module 210; a deviation detection module 212; a voice prompt module 214; and a voice prompt output device 216. These elements and features of the computing device 200 may be operatively associated with one another, coupled to one another, or otherwise configured to cooperate with one another as needed to support the desired functionality—in particular, facilitating communication for a human-machine flight team that includes the computing device 200, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with flight plan data, current aircraft states, predicted aircraft states, inferred flight crew perception or understanding of actual aircraft conditions, operational goals, nominal task models, and/or deviations from expected aircraft or flight crew behavior during flight. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The speech recognition user interface 206 may include or cooperate with various features to allow a user to interact with the computing device 200. The speech recognition user interface 206 includes at least one human-to-machine interface for speech recognition, such that the user may interact with the computing device 200 via spoken dialogue. Thus, the user may select options, input information, or otherwise control the operation of the computing device 200 by speaking into a microphone or other voice input interface configured to receive and interpret articulated speech. Additionally, the speech recognition user interface 206 may include other forms of human-to-machine interfaces, e.g., a keypad, keys, a keyboard, buttons, switches, knobs, a touchpad, a joystick, a pointing device, a virtual writing tablet, a touch screen, or any device, component, or function that enables the user to select options, input information, or otherwise control the operation of the computing device 200. For example, the speech recognition user interface 206 could be manipulated by an operator to provide user input responses to questions or prompts provided by the computing device 200, as described herein.

In certain embodiments, in addition to the voice input interface components, the speech recognition user interface 206 may include or cooperate with various features to allow a user to interact with the computing device 200 via graphical elements rendered on a display element. Accordingly, the speech recognition user interface 206 may initiate the creation, maintenance, and presentation of a graphical user interface (GUI). In certain embodiments, a communicatively-coupled display device implements touch-sensitive technology for purposes of interacting with the GUI. Thus, a user can manipulate the GUI by moving a cursor symbol rendered on the display device, or by physically interacting with the display device itself for recognition and interpretation, via the speech recognition user interface 206.

The communication device 208 is suitably configured to communicate data between the computing device 200 and one or more avionics systems onboard an aircraft. The communication device 208 may transmit and receive communications over a wired or wireless communication connection, e.g., a wireless local area network (WLAN), the Internet, a satellite uplink/downlink, a cellular network, a broadband network, a wide area network, or the like. As described in more detail below, data received by the communication device 208 may include, without limitation: flight plan data, avionics system data, operational goal data, nominal task model data, and other data compatible with the computing device 200. Data provided by the communication device 208 may include, without limitation, requests for avionics system data, flight plan data, operational goal data, nominal task model data, and the like.

The nominal task model module 210 is configured to identify current operational goals for the flight plan of the aircraft, and to obtain a nominal task model associated with the current operational goals. The nominal task model includes a set of tasks for user completion during execution of the current flight plan onboard the aircraft, and completion of the set of tasks of the nominal task model furthers the operational goals for the flight plan. The nominal task model module 210 thus identifies tasks that require completion, continuously throughout completion of the flight plan, and provides continuously updated nominal task model data to the deviation detection module 212 for analysis.

The deviation detection module 212 is configured to detect any deviation in aircraft behavior, aircraft systems behavior (e.g., avionics), and/or flight crew behavior from the operational goals or nominal task model onboard the aircraft. Deviations from the nominal task model may include any action that is different from the required response defined by the nominal task model. For example, a deviation may include an incomplete task from the nominal task model, completion of a task that is not required by the nominal task model, an incorrectly completed task from the nominal task model, or the like.

The voice prompt module 214 is configured to initiate a dialogue with the user (i.e., the pilot/flight crew member) when deviations are detected by the deviation detection module 212. The initiated dialogue includes voice-based prompts to inform and instruct the user. Voice-based prompts may include questions to prompt the user to provide additional context or information, instructions for the user to perform specific tasks onboard the aircraft, articulated statements to inform the user of current aircraft conditions and/or flight conditions, or the like.

In practice, the nominal task model module 210, the deviation detection module 212, and/or the voice prompt module 214 may be implemented with (or cooperate with) the at least one processor 202 to perform at least some of the functions and operations described in more detail herein. In this regard, the nominal task model module 210, the deviation detection module 212, and/or the voice prompt module 214 may be realized as suitably written processing logic, application program code, or the like.

The voice prompt output device 216 includes any appropriate hardware configured to provide the voice prompts (as determined by the voice prompt module 214) as articulated speech, such that any voice prompts are "spoken" to the user of the computing device 200 (i.e., the flight crew member onboard the aircraft). The voice prompt output device 216 may be implemented using any voice-based output hardware commonly used in industry, that includes a speaker communicatively coupled to the at least one processor 202, system memory 204, and voice prompt module 214, such that voice prompts may be converted into articulated speech and output via speaker. This type of hardware is well-known and in common use, and will not be described in detail herein.

Figure 3:
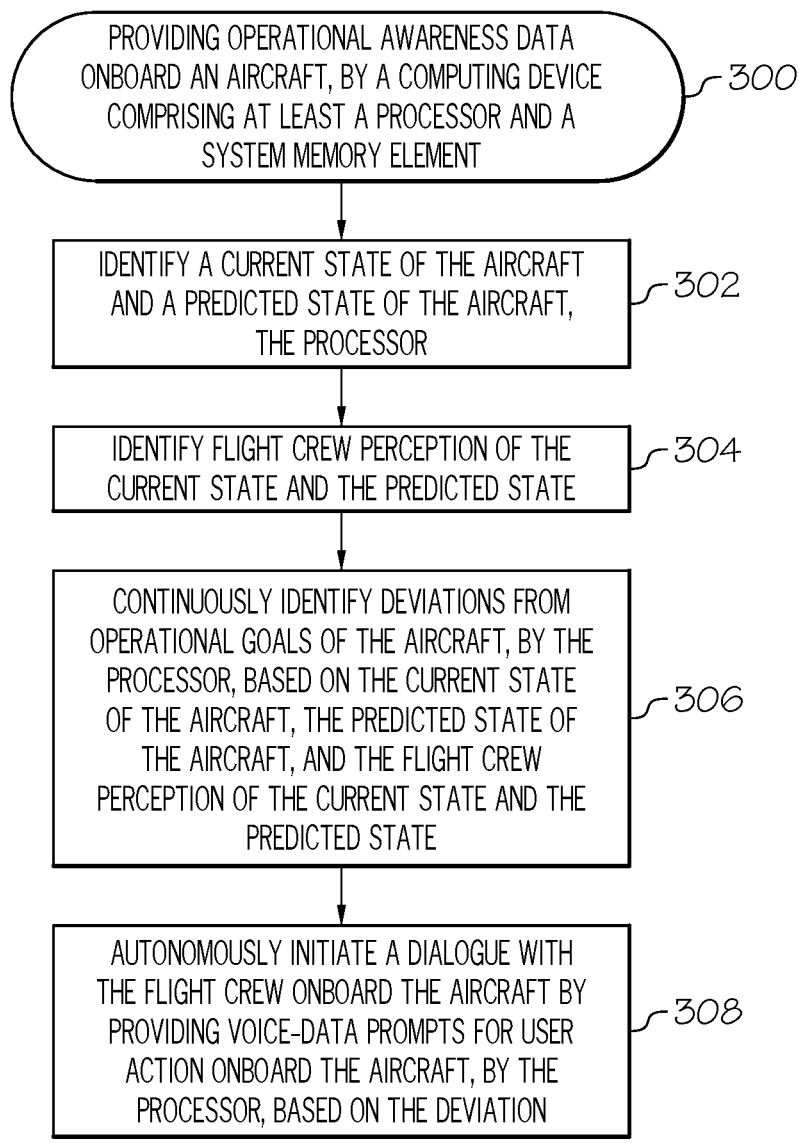
FIG. 3 is a flow chart that illustrates an embodiment of a process for providing operational awareness data onboard an aircraft, in accordance with the disclosed embodiments.

FIG. 3 is a flow chart that illustrates an embodiment of a process 300 for providing operational awareness data onboard an aircraft, in accordance with the disclosed embodiments. The process 300 operates to facilitate human-machine flight team communications, by monitoring current flight conditions and user actions onboard the aircraft, and providing a dialogue from the computing device (see reference 102, FIG. 1 and reference 200, FIG. 2) and directed toward the human operator.

First, the process 300 identifies a current state of the aircraft and a predicted state of the aircraft, by the processor (step 302). One suitable methodology for identifying a current state of the aircraft and a predicted state of the aircraft is described below with reference to FIG. 6. A current state of the aircraft is defined by current aircraft conditions and avionics system conditions within context of expected conditions determined by flight plan, programmed flight modes, and environmental conditions. A predicted state of the aircraft is a potential future state of the aircraft, based on options available in sequence from the current state, wherein the options are available as a result of expected automation actions, automation inaction, user action or user inaction.

The process 300 then identifies flight crew perception of the current state and the predicted state (step 304). Suitable methodologies for identifying flight crew perception of the current state and the predicted state are described below with reference to FIGS. 4 and 5. Flight crew perception of the current state and the predicted state may be accurate or inaccurate, based on aspects of the current situation that may be known or unknown to the flight crew member. For example, when a flight crew member is unaware of conditions that are occurring onboard the aircraft, then the flight crew member is unable to accurately discern a current state of the aircraft, and to accurately forecast potential scenarios onboard the aircraft, wherein potential scenarios include different required user actions in response.

The process 300 continuously identifies deviations from operational goals of the aircraft, by the processor, based on the current state of the aircraft, the predicted state of the aircraft, and the flight crew perception of the current state and the predicted state (step 306). One suitable methodology for identifying deviations from operational goals of the aircraft is described below with reference to FIG. 7. Operational goals for the aircraft include desired end-results associated with the flight plan, and the operational goals are accomplished through completion of a nominal task model onboard the aircraft. Deviations from the nominal task model may include any action that is different from the required response defined by the nominal task model. For example, a deviation may include an incomplete task from the nominal task model, completion of a task that is not required by the nominal task model, an incorrectly completed task from the nominal task model, or the like.

The process 300 autonomously initiates a dialogue with the flight crew onboard the aircraft by providing voice-data prompts for user action onboard the aircraft, by the processor, based on the deviation (step 308). Here, the process 300 provides instructions, information, or questions to the user in the form of articulated speech. The dialogue may provide additional context for a current flight situation, or information associated with a flight situation that the flight crew member does not appear to understand or recognize (as indicated by a lack of perception).

Figure 4:
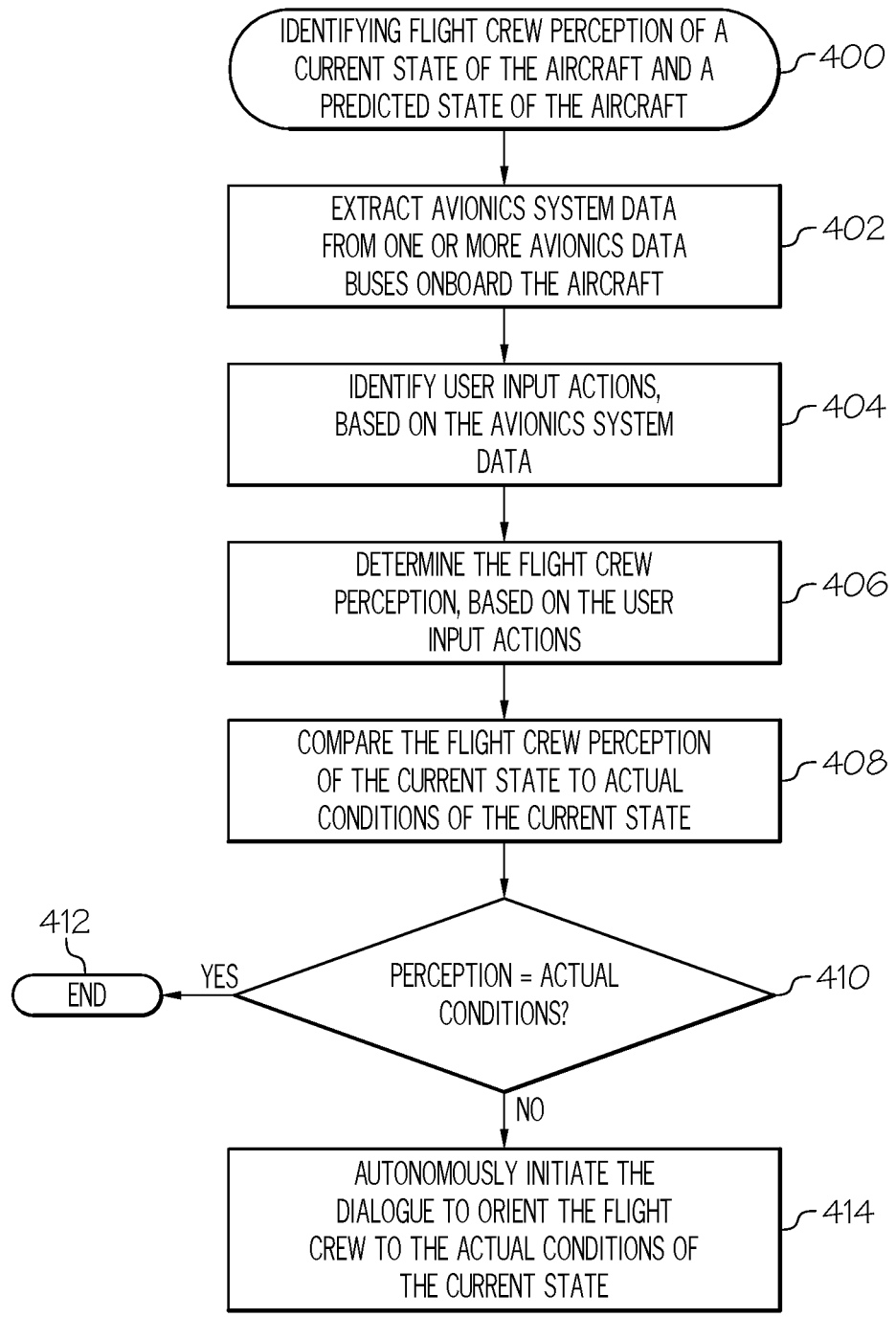
FIG. 4 is a flow chart that illustrates an embodiment of a process for identifying flight crew perception of a current state of the aircraft and a predicted state of the aircraft, in accordance with the disclosed embodiments.

FIG. 4 is a flow chart that illustrates an embodiment of a process 400 for identifying flight crew perception of a current state of the aircraft and a predicted state of the aircraft, in accordance with the disclosed embodiments. It should be appreciated that the process 400 described in FIG. 4 represents one embodiment of step 304 described above in the discussion of FIG. 3, including additional detail.

First, the process 400 extracts avionics system data from one or more avionics data buses onboard the aircraft (step 402). As described herein, a computing device (see reference 102, FIG. 1 and reference 200, FIG. 2) establishes wired or wireless communication connections to one or more avionics data buses onboard the aircraft. Here, the process 400 uses the established communication connections to extract avionics system data from the avionics data buses.

The process 400 identifies user input actions, based on the avionics system data (step 404). The process 400 determines a current state of avionics systems providing output data via the avionics data buses, and identifies previous user actions required for each of the avionics systems to reach an identified current state. Thus, the process 400 determines what the user has done, in combination with the current aircraft conditions, to cause the avionics systems to reach the current readings, settings, and output extracted from the avionics data buses.

The process 400 determines the flight crew perception, based on the user input actions (step 406). User input actions are required in response to particular flight conditions and avionics conditions. However, it is possible for a human operator to misunderstand or to be unaware of the current flight conditions, and in response, to provide an incorrect user input action. The user input actions identified in step 404 are the actual user input responses provided to the avionics systems onboard the aircraft, which may be correct or incorrect based on accurate or inaccurate awareness of current conditions. Thus, user input actions that have been provided to the avionics systems indicate perception of the human operator of the aircraft.

The process 400 then compares the flight crew perception of the current state to actual conditions of the current state (step 408), and determines whether the flight crew perception is the same as the actual conditions (decision 410). In other words, the process 400 determines whether the human operator of the aircraft is fully and accurately aware of current conditions onboard the aircraft.

When the flight crew perception is determined to be the same as the actual conditions (the "Yes" branch of 410), the process 400 ends (step 412). Here, the human operator of the aircraft is determined to be accurately aware of the current conditions onboard the aircraft, and thus, remedial measures are unnecessary and the process 400 ends. However, when the flight crew perception is not the same as the actual conditions (the "No" branch of 410), then the process 400 autonomously initiates the dialogue to orient the flight crew to the actual conditions of the current state (step 414). Here, the human operator of the aircraft is not fully and accurately aware of the current conditions onboard the aircraft, and the process 400 initiates a dialogue of voice-prompts and voice-based data to inform the human operator of current conditions onboard the aircraft, and to provide instructions to the human operator for required user actions to respond to actual conditions.

Figure 5:
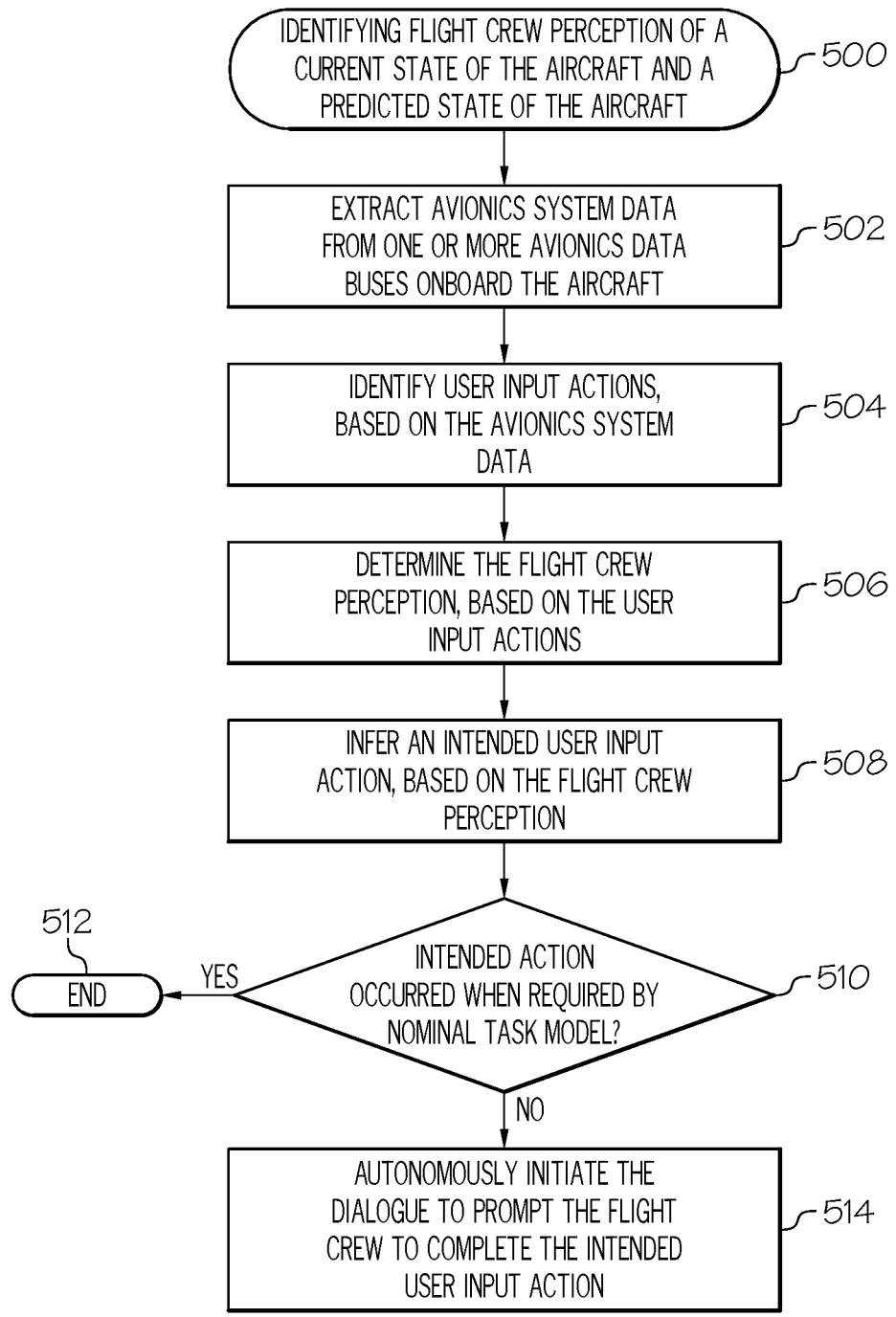
FIG. 5 is a flow chart that illustrates another embodiment of a process for identifying flight crew perception of a current state of the aircraft and a predicted state of the aircraft, in accordance with the disclosed embodiments.

FIG. 5 is a flow chart that illustrates another embodiment of a process for identifying flight crew perception of a current state of the aircraft and a predicted state of the aircraft, in accordance with the disclosed embodiments. It should be appreciated that the process 500 described in FIG. 5 represents one embodiment of step 304 described above in the discussion of FIG. 3, including additional detail. First, the process 500 extracts avionics system data from one or more avionics data buses onboard the aircraft (step 502). As described herein, a computing device (see reference 102, FIG. 1 and reference 200, FIG. 2) establishes wired or wireless communication connections to one or more avionics data buses onboard the aircraft. Here, the process 500 uses the established communication connections to extract avionics system data from the avionics data buses.

The process 500 identifies user input actions, based on the avionics system data (step 504). The process 500 determines a current state of avionics systems providing output data via the avionics data buses, and identifies previous user actions required for each of the avionics systems to reach an identified current state. Thus, the process 500 determines what the user has done, in combination with the current aircraft conditions, to cause the avionics systems to reach the current readings, settings, and output extracted from the avionics data buses.

The process 500 determines the flight crew perception, based on the user input actions (step 506). User input actions are required in response to particular flight conditions and avionics conditions. However, it is possible for a human operator to misunderstand or to be unaware of the current flight conditions, and in response, to provide an incorrect user input action. The user input actions identified in step 504 are the actual user input responses provided to the avionics systems onboard the aircraft, which may be correct or incorrect based on accurate or inaccurate awareness of current conditions. Thus, user input actions that have been provided to the avionics systems indicate perception of the human operator of the aircraft.

The process 500 infers an intended user input action, based on the flight crew perception (step 508). The nominal task model for a particular flight plan includes a set of tasks for completion by a user during execution of the flight plan. In response to particular flight conditions, a user is required to respond by providing specific user input actions to the aircraft onboard systems. Generally, the set of tasks includes sequences of user input actions for completion in response to particular flight conditions. Flight crew perception (as determined in step 506) indicates flight conditions perceived or understood by the human operator, whether the perception is accurate or inaccurate. Here, the process 500 may infer an intended user action from the previous user input actions, the determined flight crew perception, and a sequence of tasks defined by the nominal task model associated with the flight plan. When the user has already completed a particular user input action based on flight crew perception of current conditions, the next one or more user input actions in sequence (as required by the nominal task model) may be inferred as an intended user input action.

The process 500 determines whether the intended user input action occurred when required by the nominal task model (decision 510). When the intended user input action did occur when required by the nominal task model (the "Yes" branch of 510), then the process 500 ends (step 512). Here, the human operator of the aircraft is determined to have understood conditions accurately onboard the aircraft, and to have completed required tasking at the appropriate time, and thus, remedial measures are unnecessary and the process 500 ends. However, when the intended user input action did not occur when required by the nominal task model (the "No" branch of 510), then the process 500 autonomously initiates a dialogue to prompt the flight crew to complete the intended user input action (step 514). Here, the human operator of the aircraft did not complete a required user action in response to current conditions onboard the aircraft, and the process 500 initiates a dialogue of voice-prompts to instruct the human operator to complete the required action, and to provide contextual details to the human operator such that the human operator is informed of the actual conditions and appropriate user input responses and tasking.

Figure 6:
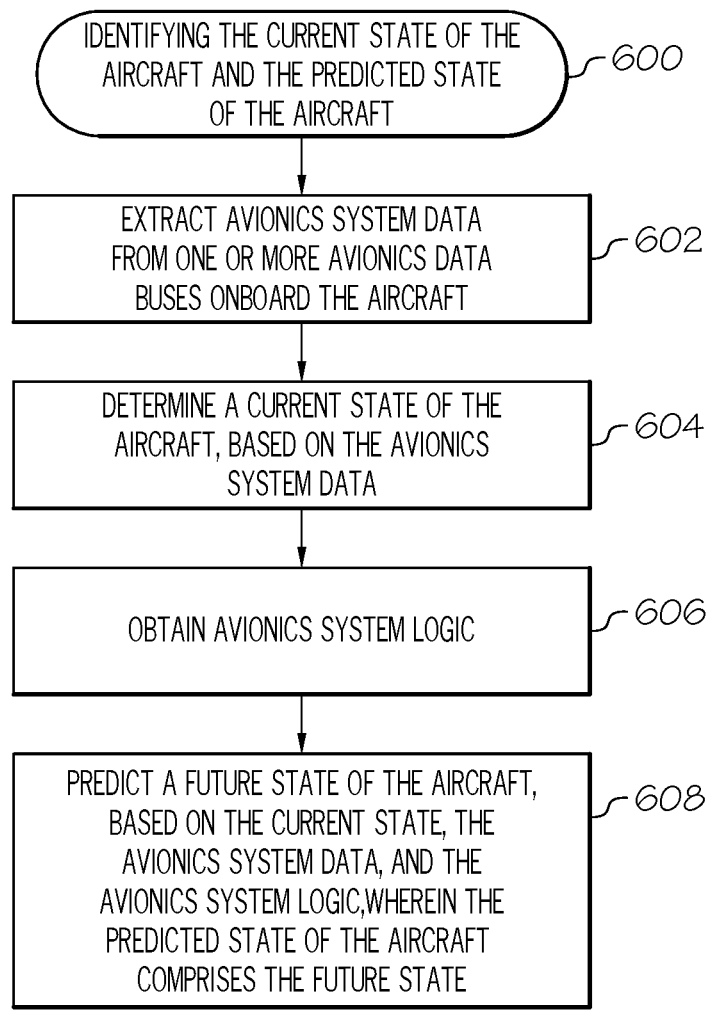
FIG. 6 is a flow chart that illustrates an embodiment of a process for identifying a current state of the aircraft and a predicted state of the aircraft, in accordance with the disclosed embodiments.

FIG. 6 is a flow chart that illustrates an embodiment of a process 600 for identifying a current state of the aircraft and a predicted state of the aircraft, in accordance with the disclosed embodiments. It should be appreciated that the process 600 described in FIG. 6 represents one embodiment of step 302 described above in the discussion of FIG. 3, including additional detail. First, the process 600 extracts avionics system data from one or more avionics data buses onboard the aircraft (step 602). As described herein, a computing device (see reference 102, FIG. 1 and reference 200, FIG. 2) establishes wired or wireless communication connections to one or more avionics data buses onboard the aircraft. Here, the process 600 uses the established communication connections to extract avionics system data from the avionics data buses.

Next, the process 600 determines a current state of the aircraft, based on the avionics system data (step 604). A current state of the aircraft is defined by current aircraft conditions and avionics system conditions defined by flight parameters (e.g., altitude, airspeed, vertical speed, roll, pitch, and yaw), flight plan (e.g., current commanded waypoint, destination airports), and flight mode (e.g., active vertical, lateral, and landing modes). Also considered are parameters that quantify adherence to the flight plan (e.g., location in space, energy parameters, speed, and the like. The process 600 then obtains avionics system logic (step 606). Exemplary embodiments of the process 600 obtain FMS logic via the avionics data bus, in step 606.

The process 600 also predicts a future state of the aircraft, based on the current state, the avionics system data, and the avionics system logic, wherein the predicted state of the aircraft comprises the future state determined by programmed flight control and modes (step 608). A predicted state of the aircraft is a potential future state of the aircraft, based on options available in sequence from the current state, wherein the options are available as a result of automated action, automated inaction, user action or user inaction.

Figure 7:
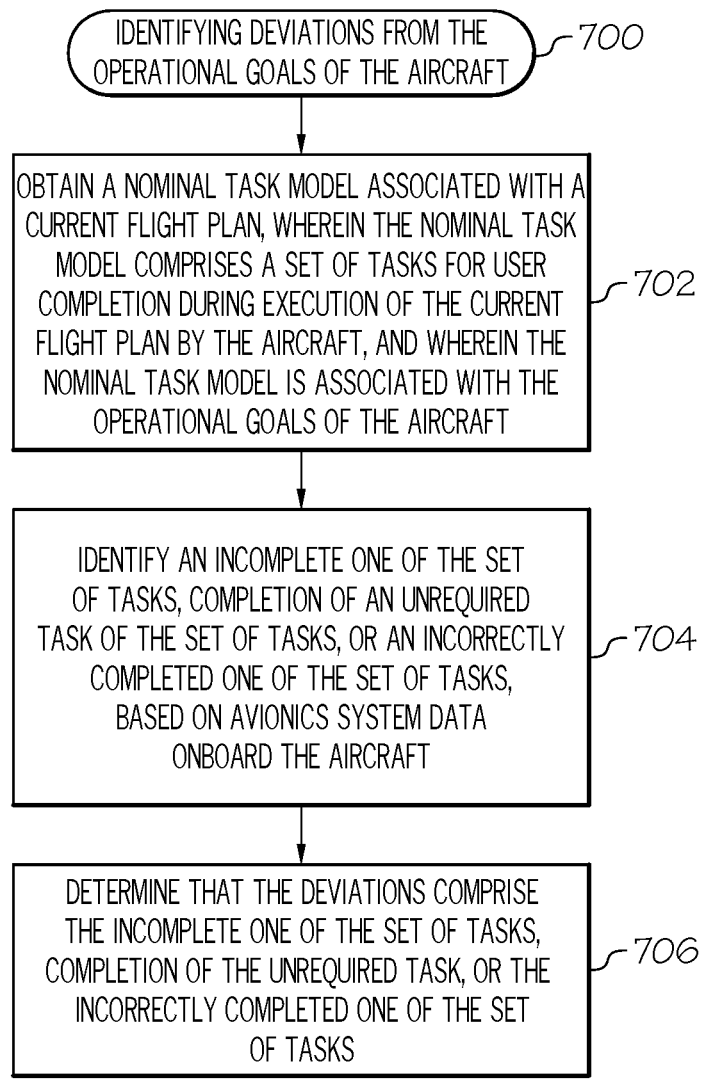
FIG. 7 is a flow chart that illustrates an embodiment of a process for identifying deviations from the operational goals of the aircraft, in accordance with the disclosed embodiments.

FIG. 7 is a flow chart that illustrates an embodiment of a process for identifying deviations from the operational goals of the aircraft, in accordance with the disclosed embodiments. It should be appreciated that the process 700 described in FIG. 7 represents one embodiment of step 306 described above in the discussion of FIG. 3, including additional detail. First, the process 700 obtains a nominal task model associated with a current flight plan (step 702). The nominal task model comprises a set of tasks for user completion during execution of the current flight plan by the aircraft, and the nominal task model is associated with the operational goals of the aircraft.

Next, the process 700 identifies an incomplete one of the set of tasks, completion of an unrequired task of the set of tasks, or an incorrectly completed task of the set of tasks, based on avionics system data onboard the aircraft (step 704). The process 700 then determines that the deviations comprise the incomplete one of the set of tasks, completion of the unrequired task, or the incorrectly completed one of the set of tasks (step 706). The nominal task model generally includes sequences of tasks appropriate for user completion in response to particular flight conditions that arise during flight. Here, the process 700 determines that a particular sequence of tasks is required for completion in response to current, actual conditions onboard the aircraft, and that a deviation from that sequence of tasks has occurred. Deviations may include, without limitation: one of the tasks (of the required sequence of tasks) is incomplete; the user has completed an unrequired task that is not included in the sequence of tasks; or one of the tasks (of the required sequence of tasks) was completed incorrectly, and thus did not produce the correct result onboard the aircraft.

The various tasks performed in connection with processes 300-700 may be performed by software, hardware, firmware, or any combination thereof. For illustrative purposes, the preceding descriptions of processes 300-700 may refer to elements mentioned above in connection with FIGS. 1-2. In practice, portions of processes 300-700 may be performed by different elements of the described system. It should be appreciated that processes 300-700 may include any number of additional or alternative tasks, the tasks shown in FIGS. 3-7 need not be performed in the illustrated order, and processes 300-700 may be incorporated into a more comprehensive procedure or process having additional functionality not described in detail herein. Moreover, one or more of the tasks shown in FIGS. 3-7 could be omitted from embodiments of the processes 300-700 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing operational awareness data onboard an aircraft, by a computing device comprising at least a processor and a system memory element, the method comprising:
   continuously identifying deviations from operational goals of the aircraft, by the processor, based on a current state of the aircraft, a predicted state of the aircraft, and flight crew perception of the current state and the predicted state;
   autonomously initiating a dialogue with flight crew onboard the aircraft by providing voice-data prompts for user action onboard the aircraft, by the processor onboard the aircraft, based on the deviations;
   identifying the flight crew perception of the current state and the predicted state, by:
      extracting avionics system data from one or more avionics data buses;
      identifying user input actions, based on the avionics system data; and
      determining the flight crew perception, based on the user input actions;
   inferring an intended user input action, based on the flight crew perception;
   determining that the intended user input action did not occur when required by a nominal task model associated with the operational goals of the aircraft, wherein the nominal task model comprises a set of tasks for user completion during execution of a current flight plan by the aircraft; and
   autonomously initiating the dialogue to prompt the flight crew to complete the intended user input action.

2. The method of claim 1, further comprising:
   comparing the flight crew perception of the current state to actual conditions of the current state, by the processor; and
   when the flight crew perception does not match the actual conditions, autonomously initiating the dialogue to orient the flight crew to the actual conditions onboard the aircraft.

3. The method of claim 1, further comprising identifying the current state and the predicted state of the aircraft, by:
   extracting avionics system data from one or more avionics data buses;
   determining the current state of the aircraft, based on the avionics system data;
   obtaining avionics system logic, from the one or more avionics data buses; and
   predicting a future state of the aircraft, based on the current state, the avionics system data, and the avionics system logic, wherein the predicted state of the aircraft comprises the future state.

4. The method of claim 1, further comprising identifying the deviations from the operational goals of the aircraft, by:
   obtaining a nominal task model associated with a current flight plan, wherein the nominal task model comprises a set of tasks for user completion during execution of the current flight plan by the aircraft, and wherein the nominal task model is associated with the operational goals of the aircraft;
   identifying an incomplete one of the set of tasks, by the processor, based on avionics system data onboard the aircraft, wherein the incomplete one requires completion based on the current state and the predicted state of the aircraft; and
   determining that the deviations comprise the incomplete one.

5. The method of claim 1, further comprising identifying the deviations from the operational goals of the aircraft, by:
   obtaining a nominal task model associated with a current flight plan, wherein the nominal task model comprises a set of tasks for user completion during execution of the current flight plan by the aircraft, and wherein the nominal task model is associated with the operational goals of the aircraft;
   identifying completion of an unrequired task of the set of tasks, by the processor, based on avionics system data onboard the aircraft, wherein the unrequired task does not require completion based on the current state and the predicted state of the aircraft; and
   determining that the deviations comprise the completion of the unrequired task.

6. The method of claim 1, further comprising identifying the deviations from the operational goals of the aircraft, by:
   obtaining a nominal task model associated with a current flight plan, wherein the nominal task model comprises a set of tasks for user completion during execution of the current flight plan by the aircraft, and wherein the nominal task model is associated with the operational goals of the aircraft;
   identifying an incorrectly completed one of the set of tasks, by the processor, based on avionics system data onboard the aircraft, wherein the incorrectly completed one requires completion based on the current state and the predicted state of the aircraft; and determining that the deviations comprise the incorrectly completed one.

7. A system for providing operational awareness data onboard an aircraft, the system comprising:
a system memory element;
voice prompt generation hardware, configured to provide articulated dialogue onboard the aircraft;
a communication device, configured to establish communication connections to one or more avionics data buses onboard the aircraft; and
at least one processor, communicatively coupled to the system memory element and the voice prompt generation hardware, the at least one processor configured to:
continuously identify deviations from operational goals of the aircraft, based on a current state of the aircraft, a predicted state of the aircraft, and flight crew perception of the current state and the predicted state;
autonomously initiate a dialogue with flight crew onboard the aircraft by providing voice-data prompts for user action onboard the aircraft, based on the deviations, via the voice prompt generation hardware;
identify the flight crew perception of the current state and the predicted state, by:
extracting avionics system data from the one or more avionics data buses;
identifying user input actions, based on the avionics system data; and
determining the flight crew perception, based on the user input actions;
infer an intended user input action, based on the flight crew perception;
determine that the intended user input action did not occur when required by a nominal task model associated with the operational goals of the aircraft, wherein the nominal task model comprises a set of tasks for user completion during execution of a current flight plan by the aircraft, and wherein the set of tasks includes completion of the intended user input action; and
autonomously initiate the dialogue to prompt the flight crew to complete the intended user input action.

8. The system of claim 7, wherein the at least one processor is further configured to:
compare the flight crew perception of the current state to actual conditions of the current state; and
when the flight crew perception does not match the actual conditions, autonomously initiate the dialogue to orient the flight crew to the actual conditions onboard the aircraft.

9. The system of claim 7, wherein the at least one processor is further configured to identify the current state and the predicted state of the aircraft, by:
extracting avionics system data from one or more avionics data buses;
determining the current state of the aircraft, based on the avionics system data;
obtaining avionics system logic, from the one or more avionics data buses; and
predicting a future state of the aircraft, based on the current state, the avionics system data, and the avionics system logic, wherein the predicted state of the aircraft comprises the future state.

10. The system of claim 7, wherein the at least one processor is further configured to identify the deviations from the operational goals of the aircraft, by:
obtaining a nominal task model associated with a current flight plan, wherein the nominal task model comprises a set of tasks for user completion during execution of the current flight plan by the aircraft, and wherein the nominal task model is associated with the operational goals of the aircraft;
identifying an incomplete one of the set of tasks, based on avionics system data onboard the aircraft, wherein the incomplete one requires completion based on the current state and the predicted state of the aircraft; and
determining that the deviations comprise the incomplete one.

11. The system of claim 7, wherein the at least one processor is further configured to identify the deviations from the operational goals of the aircraft, by:
obtaining a nominal task model associated with a current flight plan, wherein the nominal task model comprises a set of tasks for user completion during execution of the current flight plan by the aircraft, and wherein the nominal task model is associated with the operational goals of the aircraft;
identifying completion of an unrequired task of the set of tasks, based on avionics system data onboard the aircraft, wherein the unrequired task does not require completion based on the current state and the predicted state of the aircraft; and
determining that the deviations comprise the completion of the unrequired task.

12. The system of claim 7, wherein the at least one processor is further configured to identify the deviations from the operational goals of the aircraft, by:
obtaining a nominal task model associated with a current flight plan, wherein the nominal task model comprises a set of tasks for user completion during execution of the current flight plan by the aircraft, and wherein the nominal task model is associated with the operational goals of the aircraft;
identifying an incorrectly completed one of the set of tasks, based on avionics system data onboard the aircraft, wherein the incorrectly completed one requires completion based on the current state and the predicted state of the aircraft; and
determining that the deviations comprise the incorrectly completed one.

13. A non-transitory, computer-readable medium containing instructions thereon, which, when executed by a processor, perform a method providing operational awareness data onboard an aircraft, the method comprising:
identifying a current state of the aircraft and a predicted state of the aircraft, by:
extracting avionics system data from one or more avionics data buses;
determining the current state of the aircraft, based on the avionics system data;
obtaining avionics system logic, from the one or more avionics data buses; and
predicting a future state of the aircraft, based on the current state, the avionics system data, and the avionics system logic, wherein the predicted state of the aircraft comprises the future state;
identifying flight crew perception of the current state and the predicted state, by:
identifying user input actions, based on the avionics system data; and determining the flight crew perception, based on the user input actions;

continuously identifying deviations from operational goals of the aircraft, by the processor, based on the current state of the aircraft, the predicted state of the aircraft, and the flight crew perception of the current state and the predicted state;

autonomously initiating a dialogue with flight crew onboard the aircraft by providing voice-data prompts for user action onboard the aircraft, by the processor onboard the aircraft, based on the deviations;

inferring an intended user input action, based on the flight crew perception;

determining that the intended user input action did not occur when required by a nominal task model associated with the operational goals of the aircraft, wherein the nominal task model comprises a set of tasks for user completion during execution of a current flight plan by the aircraft; and autonomously initiating the dialogue to prompt the flight crew to complete the intended user input action.

14. The non-transitory, computer-readable medium of claim 13, wherein the method further comprises:

comparing the flight crew perception of the current state to actual conditions of the current state, by the processor; and when the flight crew perception does not match the actual conditions, autonomously initiate the dialogue to orient the flight crew to the actual conditions onboard the aircraft.

15. The non-transitory, computer-readable medium of claim 13, wherein the method further comprises identifying the deviations from the operational goals of the aircraft, by:

obtaining a nominal task model associated with a current flight plan, wherein the nominal task model comprises a set of tasks for user completion during execution of the current flight plan by the aircraft, and wherein the nominal task model is associated with the operational goals of the aircraft;

identifying an incomplete one of the set of tasks, an incorrectly completed one of the set of tasks, or an unrequired one of the set of tasks, by the processor, based on avionics system data onboard the aircraft, wherein the incomplete one requires completion based on the current state and the predicted state of the aircraft, wherein the unrequired one of the set of tasks does not require completion based on the current state and the predicted state of the aircraft, and wherein the incorrectly completed one requires completion based on the current state and the predicted state of the aircraft; and determining that the deviations comprise at least one of the incomplete one, the incorrectly completed one, or the unrequired one.

* * * * *